United States Patent [19]

Doering

[11] Patent Number: 4,624,195
[45] Date of Patent: Nov. 25, 1986

[54] GRAVITY SPREADER

[75] Inventor: Charles W. Doering, Louisville, Ky.

[73] Assignee: Brinly-Hardy Co., Inc., Louisville, Ky.

[21] Appl. No.: 632,968

[22] Filed: Jul. 20, 1984

[51] Int. Cl.⁴ .............................................. A01C 7/08
[52] U.S. Cl. .................................... 111/12; 222/625
[58] Field of Search ...................... 111/8–13, 111/34, 58, 50, 59–62, 70, 77, 78; 222/608, 610, 613, 614, 616, 618, 623–625; 56/253, 254

[56] References Cited

U.S. PATENT DOCUMENTS

| | | | |
|---|---|---|---|
| 284,189 | 9/1883 | Dillon | 111/37 |
| 375,741 | 1/1888 | Gilmore et al. | 111/13 |
| 571,827 | 11/1896 | Burdge | 111/11 |
| 729,774 | 6/1903 | Kralinger et al. | 111/11 |
| 884,651 | 4/1908 | Frey | 56/254 |
| 1,541,395 | 6/1925 | Romig | 56/254 |
| 1,859,625 | 5/1932 | Laing | 222/624 X |
| 1,876,409 | 9/1932 | Gordon | 111/10 X |
| 1,887,334 | 11/1932 | Spaeth | 111/11 |
| 1,912,836 | 6/1933 | Glaser | 56/254 |
| 2,336,099 | 12/1943 | Hyland | 111/34 |
| 2,792,970 | 5/1957 | Gaiman | 222/610 |
| 2,899,111 | 8/1959 | Christensen | 222/625 X |
| 4,155,315 | 5/1979 | Dobbins | 111/10 X |

FOREIGN PATENT DOCUMENTS 316425 8/1929 United Kingdom ............ 56/254

Primary Examiner—James R. Feyrer
Attorney, Agent, or Firm—Frank C. Leach, Jr.

[57] ABSTRACT

A gravity spreader includes a hopper having openings in its bottom through which material flows when a shutter is not in a closed position with the position of the shutter determining the rate of flow of material. A fluted roller allows the material to flow from the hopper to the ground only when the hopper is moving in a forward direction. The fluted roller does not rotate when the hopper is stopped or when the hopper moves in a reverse direction so that the material does not flow to the ground irrespective of the open position of the shutter.

10 Claims, 9 Drawing Figures

GRAVITY SPREADER

This invention relates to a gravity spreader for material and, more particularly, to a gravity spreader in which material flows to the ground only when the gravity spreader is being moved in a forward direction.

Gravity spreaders are employed to spread material such as fertilizer or grass seed, for example, over the ground. Gravity spreaders usually include a hopper having openings in its bottom through which material flows to the ground with a shutter controlling whether the openings are closed or opened to varying amounts to have various flow rates of the material to the ground.

When forward movement of these gravity spreaders ceases, it is necessary for the user to move the shutter immediately to a closed position. If not, there is an overdeposit of the material that can damage the lawn if fertilizer, for example, is being applied.

By having to move the shutter to a closed position whenever the gravity spreader stops or its motion is reversed to that it would be moving over the same area of the ground, the return of the shutter to the desired position for a specific flow rate is not necessarily always obtained. Accordingly, some areas of the ground will receive different amounts of the material than adjacent areas because of the movement of the shutter to its closed position and its return to its open position.

There also is the possibility that the shutter will be opened too quickly or too late to produce either an overdeposit or an underdeposit at the time that the motion of the gravity spreader in a forward direction again occurs. This also can cause damage to the lawn.

The gravity spreader of the present invention satisfactorily solves the foregoing problems through having flow occur from the gravity spreader only when the gravity spreader is moving in a forward direction without any change in the position of the shutter. Therefore, the user does not have to remember to close the shutter when movement of the gravity spreader stops or the gravity spreader is moved in the reverse direction.

The user of the gravity spreader of the present invention also does not have to return the shutter to the desired open position after each stopping of forward motion or ceasing reversing motion of the gravity spreader. Thus, substantially the same flow rate of material will occur when forward motion again occurs after there has been reverse motion of the gravity spreader or forward motion of the gravity spreader has stopped.

The gravity spreader of the present invention accomplishes this through utilizing an arrangement in which means is disposed beneath the openings in the bottom of the hopper of the gravity spreader to stop flow whenever the means is not being moved. This means moves only when there is forward motion of the gravity spreader.

An object of this invention is to provide a gravity spreader having flow automatically stopped whenever the gravity spreader is not moving in a forward direction.

Another object of this invention is to provide a gravity spreader in which material is spread only during forward movement of the spreader.

A further object of this invention is to provide a unique gravity spreader.

Other objects of this invention will be readily perceived from the following description, claims, and drawings.

This invention relates to a gravity spreader including material holding means for holding material to be spread and wheel means for supporting the material holding means for movement along the ground in a forward or rearward direction. The material holding means has openings at its bottom to allow the flow of material therefrom with the rate of flow through the opening means being controlled by first means, which is movable to a position to stop flow through the opening means in addition to controlling the rate of flow. Second means stops flow through the opening means when the material holding means is not moving in a forward direction irrespective of the open position of the first means.

The attached drawings illustrate preferred embodiments of the invention, in which.

Figure 1:
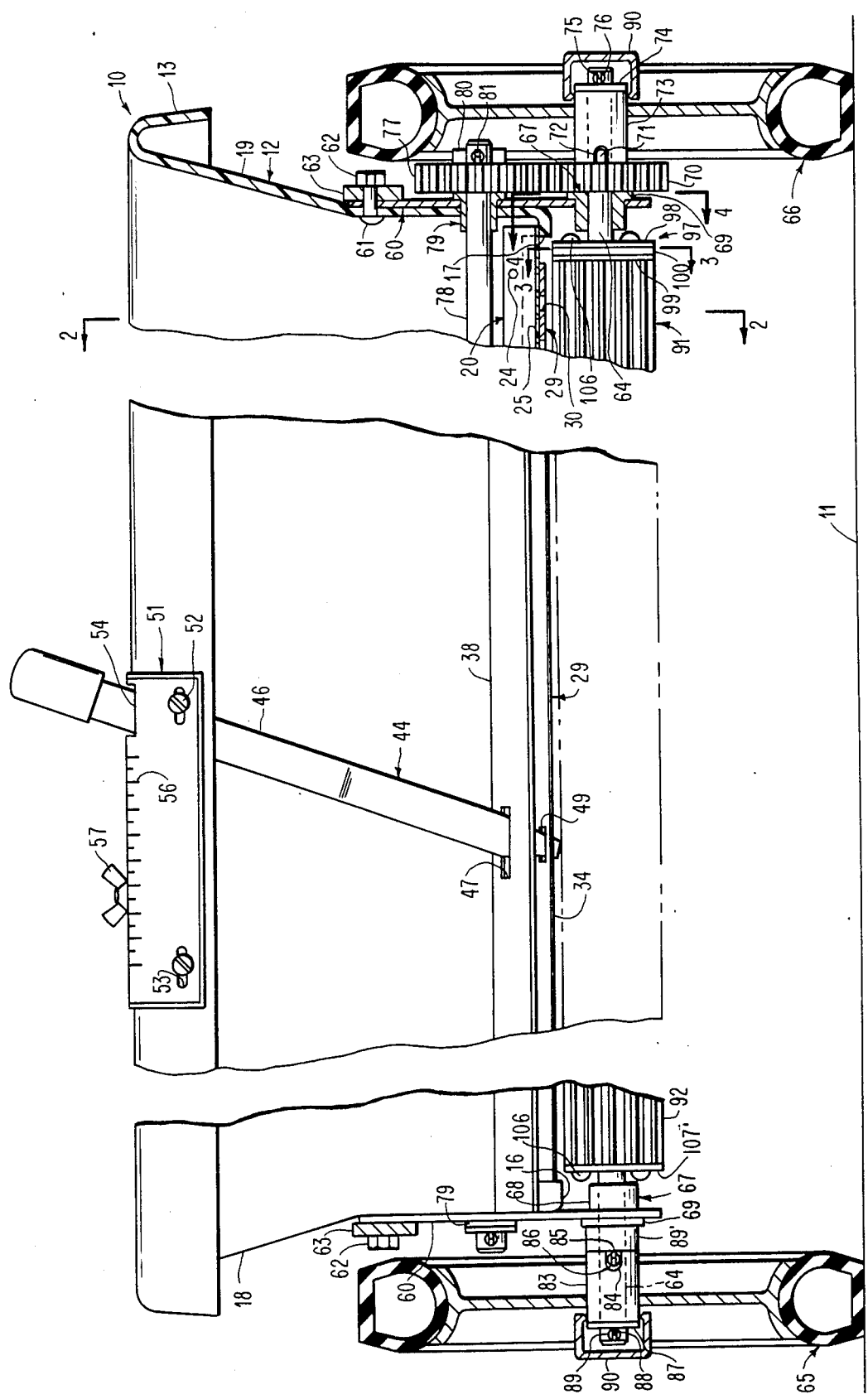
FIG. 1 is a front elevational view, partly in section, of a gravity spreader of the present invention.

Referring to the drawings and particularly FIG. 1, there is shown a gravity spreader 10 for advancement along ground 11. The gravity spreader 10 includes a hopper 12 for holding material to be spread by the spreader 10. The hopper 12, which is formed of a suitable plastic material such as high density polyethylene, for example, has a continuous rim or flange 13 extending downwardly from its open upper end and in surrounding relation to its open upper end.

Figure 2:
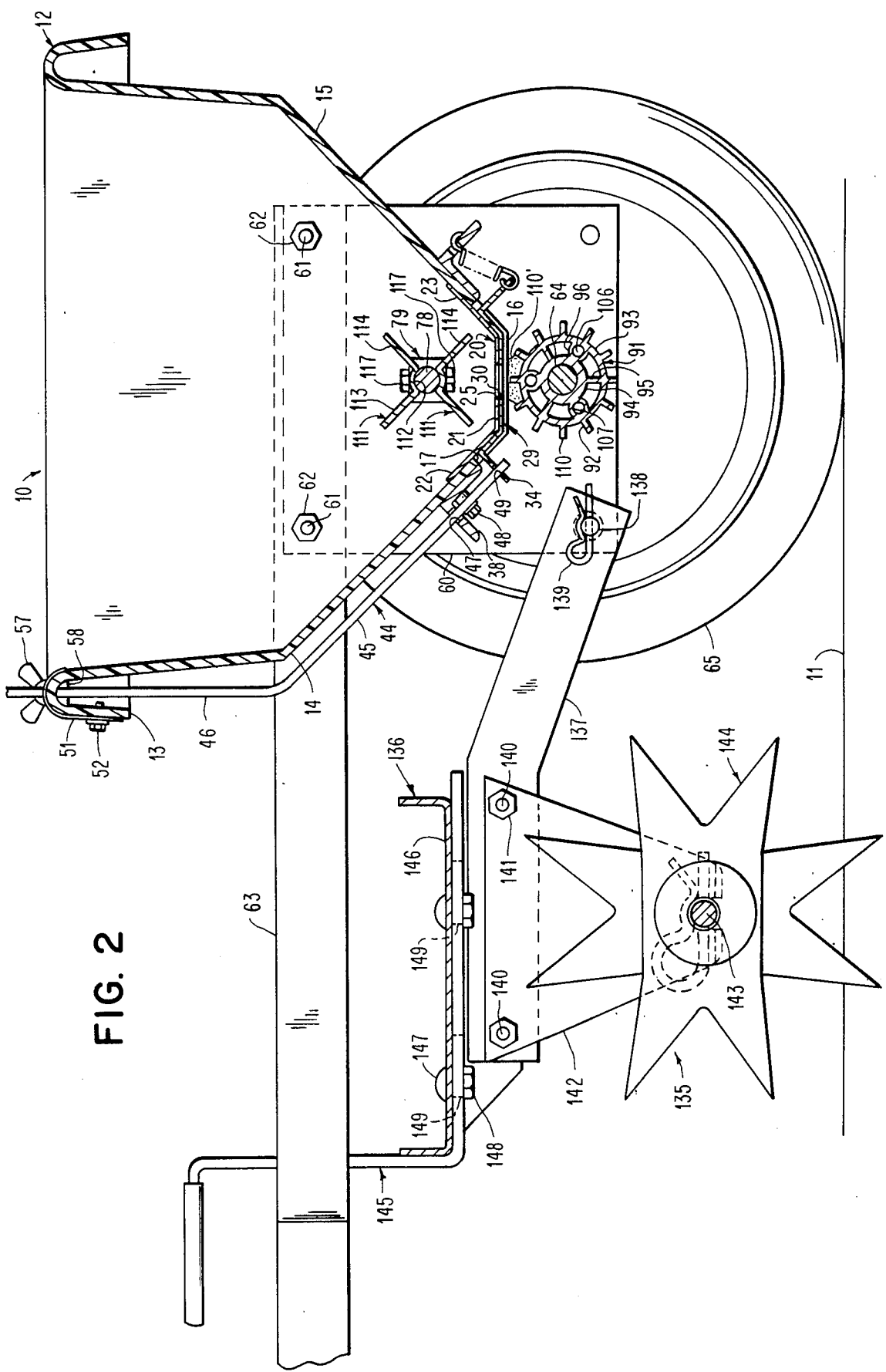
FIG. 2 is a sectional view of the gravity spreader of FIG. 1 and taken along line 2—2 of FIG. 1 with a shutter open.
Figure 3:
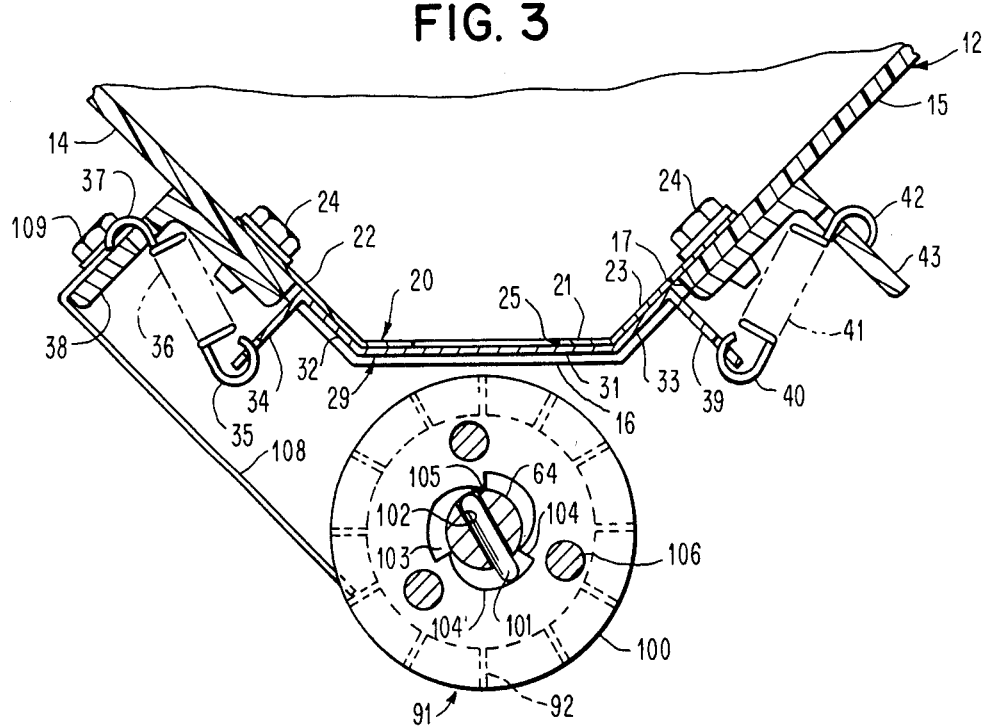
FIG. 3 is a fragmentary sectional view of a portion of the gravity spreader of FIG. 1 taken along line 3—3 of FIG. 1 with the shutter closed and showing a drive arrangement to control rotation of a fluted roller.

As shown in FIG. 2, the hopper 12 has its front wall 14 and its rear wall 15 converge towards each other with a substantially horizontal bottom wall 16 joining the bottom ends of the front wall 14 and the rear wall 15. A large opening 17, which has a substantially rectangular shape when viewed from above, is formed in the bottom wall 16 and portions of the front wall 14 and the rear wall 15 as shown in FIG. 3. As shown in FIG. 1, the hopper 12 has its right side wall 18 and its left side wall 19 substantially straight in its lower portion where each connects with the bottom wall 16.

As shown in FIG. 2, a gate 20 includes a substantially horizontal bottom wall 21, an inclined forward wall 22, and an inclined rear wall 23 for cooperation with the bottom wall 16, a lower portion of the front wall 14, and a lower portion of the rear wall 15, respectively. The gate 20 overlies the opening 17 in the hopper 12. As shown in FIG. 3, the gate 20 is retained in its desired position by screws 24 extending through the inclined front wall 22 of the gate 20 and the front wall 14 of the hopper 12 and through the inclined rear wall 23 of the gate 20 and the rear wall 15 of the hopper 12.

Figure 5:
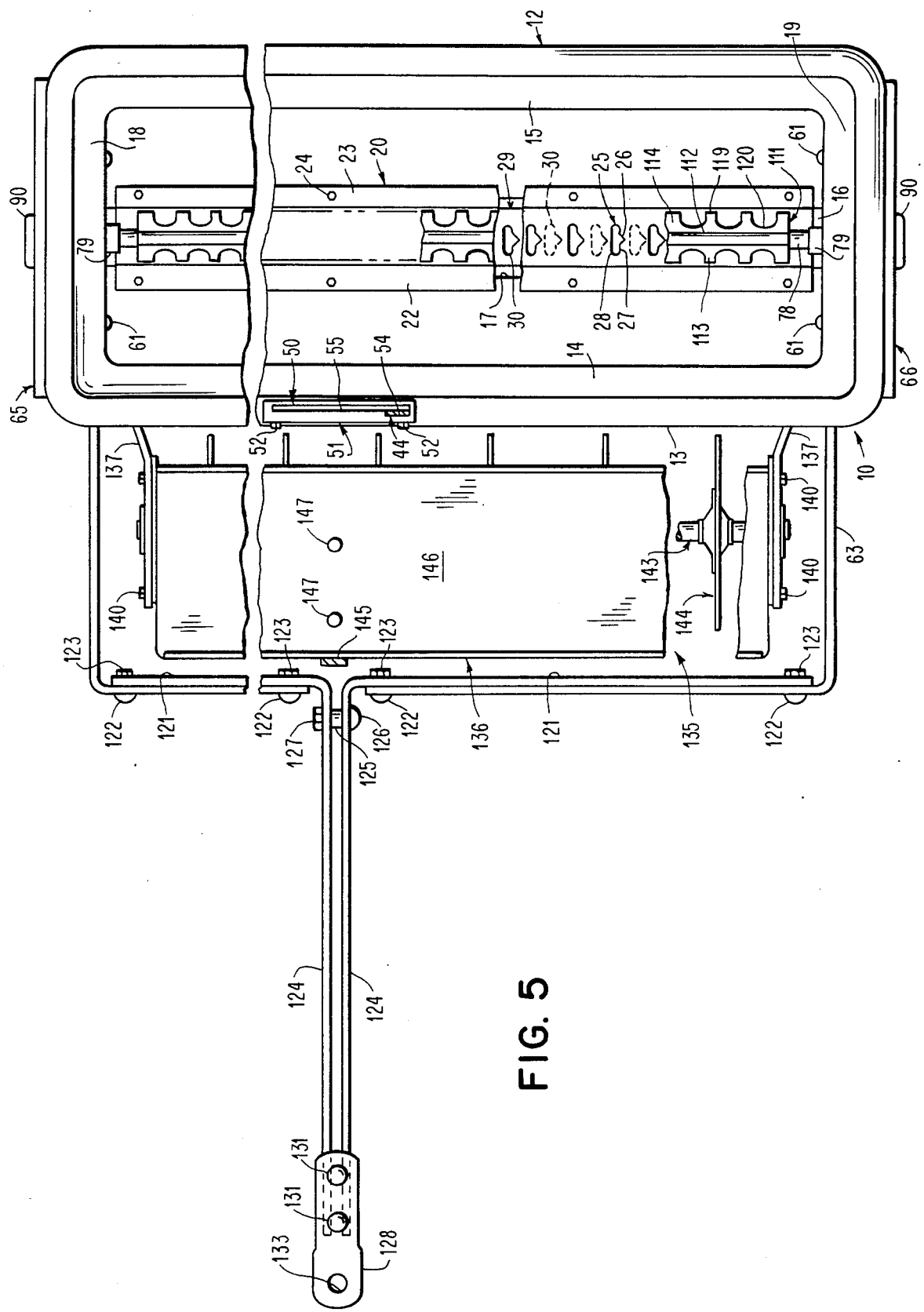
FIG. 5 is a top plan view of the gravity spreader of FIG. 1.

The flat bottom wall 21 of the gate 20 has a plurality of openings 25 formed therein overlying a portion of the opening 17 in the bottom wall 16 of the hopper 12. As shown in FIG. 5, each of the openings 25 has the same shape, and the openings 25 are spaced equal distances from each other.

Each of the openings 25 has a triangular shaped portion 26 extending from a wall 27 of a substantially rectangular shaped portion 28. Each of the portions 26 and 28 extends for the same distance from the wall 27 with this distance being 7/32" when the walls 27 of the openings 25 are spaced 1" from each other.

A shutter 29 is disposed beneath the gate 20 for sliding movement relative thereto in a direction substantially perpendicular to the walls 27 of the openings 25. The shutter 29 has openings 30, which are the same shape, size, and spacing as the openings 25 in the gate 20. The shutter 29 is shown in its closed position in FIG. 5 and moves towards the bottom of FIG. 5 to open.

The shutter 29 includes a substantially horizontal bottom wall 31 (see FIG. 3), which has the openings 30 (see FIG. 5) therein, in sliding contact with the bottom surface of the bottom wall 21 of the gate 20 as shown in FIG. 3. The shutter 29 includes an inclined front wall 32, which slides along the bottom surface of the inclined front wall 22 of the gate 20, and an inclined rear wall 33, which slides along the bottom surface of the inclined rear wall 23 of the gate 20.

The inclined front wall 32 of the shutter 29 has a flange 34 extending substantially perpendicular from its upper end. The flange 34 has an end 35 of each of a plurality of springs 36 attached thereto at spaced portions along the flange 34. Each of the springs 36 has its other end 37 attached to an L-shaped angle 38. The L-shaped angle 38 is secured to the lower portion of the front wall 14 of the hopper 12 by the screws 24, which also secure the inclined front wall 22 of the gate 20 to the lower portion of the front wall 14 of the hopper 12.

The inclined rear wall 33 of the shutter 29 has a flange 39 extending substantially perpendicular from its upper end. The flange 39 has one end 40 of each of a plurality of springs 41 attached thereto at spaced portions along the flange 39. Each of the springs 41 has its other end 42 attached to an L-shaped angle 43. The L-shaped angle 43 is secured to the lower portion of the rear wall 15 of the hopper 12 by the screws 24, which also secure the inclined rear wall 23 of the gate 20 to the lower portion of the rear wall 15 of the hopper 12.

The springs 36 and 41 cooperate to hold the shutter 29 against the gate 20 in any position to which the shutter 29 is moved. Thus, the springs 36 and 41 continuously urge the shutter 29 against the gate 20.

The shutter 29 is moved to various positions relative to the gate 20 through a shutter lever 44 (see FIG. 2). The shutter lever 44 has a lower portion 45 disposed at an angle to an upper portion 46 with the portions 45 and 46 conforming to the configuration of the front wall 14 of the hopper 12 as shown in FIG. 2.

The lower portion 45 of the shutter lever 44 extends through a longitudinal slot 47 (see FIG. 1) in the L-shaped angle 38 and is pivotally mounted on the L-shaped angle 38 by a pivot pin 48 (see FIG. 2). The lower portion 45 of the shutter lever 44 extends through a slot 49 in the flange 34 of the shutter 29.

The upper portion 46 of the shutter lever 44 extends through a longitudinal slot 50 (see FIG. 5) in a register plate 51, which is mounted on the rim 13 (see FIG. 1) of the hopper 12. The register plate 51 is attached to the rim 13 by a pair of screws 52 extending through a pair of elongated slots 53 in the register plate 51. This enables adjustment of the register plate 51 initially so that the upper portion 46 of the shutter lever 44 is disposed in an enlarged end portion 54 (see FIG. 5) of the longitudinal slot 50, which includes a narrow elongated portion 55, when the shutter 29 (see FIG. 2) is in its closed position.

This results in the upper portion 46 of the shutter lever 44 having to be moved from the enlarged end portion 54 (see FIG. 5) of the slot 50 when it is desired to move the shutter lever 44 to an open position. When the upper portion 46 (see FIG. 2) of the shutter lever 44 is moved along the narrow elongated portion 55 (see FIG. 5) of the longitudinal slot 50, its movement is stopped relative to one of a plurality of indicia 56 (see FIG. 1) on the register plate 51. When this position is determined, a stop screw 57 is positioned within a nut 58 (see FIG. 2), which is shaped as shown in FIG. 2 so as to be prevented from rotating by the rim 13 and the upper portion of the front wall 14 of the hopper 12, to prevent the shutter lever 44 from moving beyond the desired open position. This also enables the shutter lever 44 to be returned to the same position if it is ever moved therefrom by the user such as when filling the hopper 12, for example, when it is desired to have the shutter 29 in its closed position.

Each of the side walls 18 (see FIG. 1) and 19 of the hopper 12 has a square shaped support plate 60 mounted on its lower straight portion and extending downwardly beyond the bottom wall 16 of the hopper 12. Each of the support plates 60 is attached to the side walls 18 and 19 by bolts 61 and nuts 62. A first tow bar 63, which is substantially horizontal and is L-shaped when viewed from above as shown in FIG. 5, is attached to each of the support plates 60 (see FIG. 1) by the bolts 61 and the nuts 62. The support plates 60 are welded to the ends of the L-shaped angles 38 (see FIG. 3) and 43.

Figure 4:
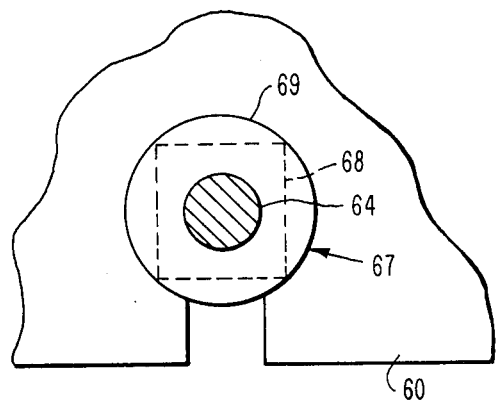
FIG. 4 is a fragmentary elevational view, partly in section, of the gravity spreader of FIG. 1 and taken along line 4—4 of FIG. 1.

The support plates 60 (see FIG. 1) support opposite ends of an axle or shaft 64 on which a right wheel 65 and a left wheel 66 are rotatably supported to enable movement of the hopper 12 along the ground 11. The shaft 64 is rotatably supported in each of the support plates 60 through being disposed within a bearing 67 mounted in each of the support plates 60. Each of the bearings 67 includes a square shaped portion 68 (see FIG. 4) extending through a corresponding square shaped opening in the support plate 60 and a circular shoulder 69 bearing against the outer surface of the support plate 60 as shown in FIG. 1.

Figure 7:
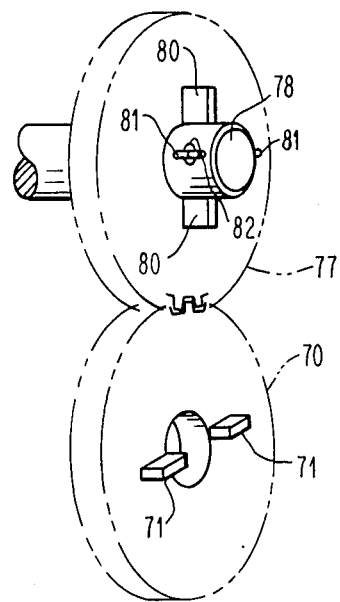
FIG. 7 is a fragmentary isometric view of a portion of the gravity spreader of FIG. 1 and showing a gearing arrangement for rotating an agitator.

The outer surface of the circular shoulder 69 of one of the bearings 67 has a gear 70 bearing thereagainst. As shown in FIG. 7, the gear 70 has a lug 71, which comprises a pair of diametrically disposed portions, on its side remote from the bearing 67 (see FIG. 1). The portions of the lug 71 fit within a pair of diametrically disposed U-shaped slots 72 in the inner end of a hub 73 of the left wheel 66. The hub 73, which fits over the shaft 64, has a retaining washer 74 bearing against its outer end. A cotter pin 75, which is disposed within a passage 76 extending through the shaft 64, bears against the outer end of the retaining washer 74 to retain the left wheel 66 on the shaft 64.

The gear 70 meshes with a gear 77, which is rotatably mounted on an agitator shaft 78. The agitator shaft 78 is rotatably supported in the side walls 18 and 19 of the hopper 12 and the square shaped plates 60 by bearings 79, which have the same configuration as the bearings 67.

The gear 77 has a lug 80 (see FIG. 7), which comprises a pair of diametrically disposed portions, for cooperation with a cotter pin 81 extending through a passage 82 in the end of the agitator shaft 78. Accordingly, when the wheels 65 (see FIG. 1) and 66 rotate in either direction, the lug 80 moves into engagement with the cotter pin 81 to cause rotation of the agitator shaft 78 therewith.

The mounting arrangement of the left wheel 66 on the shaft 64 enables the left wheel 66 to rotate relative to the shaft 64. The driving connection of the wheels 65 and 66 to the shaft 64 is through a hub 83 of the right wheel 65. The hub 83 has a pair of diametrically disposed U-shaped slots 84 in its inner end to receive a cotter pin 85 passing through a passage 86 in the shaft 64.

The hub 83, which fits over the shaft 64, has a retaining washer 87 bearing against its outer end. A cotter pin 88, which is disposed in a passage 89 extending through the shaft 64, acts against the outer end of the retaining washer 87 to retain the right wheel 65 on the shaft 64.

The outer surface of the circular shoulder 69 of the bearing 67, which has the square shaped portion 68 extending through a corresponding square shaped opening in the support plate 60 attached to the side wall 18, has a spacer 89' bearing thereagainst. The spacer 89' also bears against the inner end of the hub 83 of the right wheel 65.

A dust cap 90 is disposed over each end of the shaft 64 and overlies the retaining washers 74 and 87. The dust caps 90 are mounted on the hubs 73 and 83.

A fluted roller 91 is supported on the shaft 64 and rotates therewith when the hopper 12 is advanced in a forward direction but does not rotate therewith when the hopper 12 is moved in a reverse direction. Therefore, the fluted roller 91 is responsive only to the wheels 65 and 66 being rotated in a direction to move the hopper 12 in a forward direction.

The fluted roller 91 includes a plurality of longitudinally extending flutes or fingers 92 (see FIG. 2) extending outwardly from an outer circular drum 93. The flutes or fingers 92 are equally angularly spaced about the outer circular drum 93 from each other. Since there are twelve of the flutes or fingers 92, they are disposed 30° from each other. It should be understood that the number of the flutes or fingers 92 may be greater or lesser than twelve.

The outer circular drum 93 is attached to an inner circular drum 94 by a plurality of radially extending ribs 95. There also are three equally angularly spaced longitudinally extending circular hollow elements 96 between the inner surface of the outer circular drum 93 and the outer surface of the inner circular drum 94. The inner surface of the inner circular drum 94 receives the shaft 64.

One end of the fluted roller 91 has drive means 97 (see FIG. 1) attached thereto to enable the fluted roller 91 to rotate with the shaft 64 when the hopper 12 is advanced in the forward direction and to not rotate with the shaft 64 when the hopper 12 is moved in the reverse direction. The drive means 97 includes a pair of retaining washers 98 and 99 having a plate 100 therebetween. As shown in FIG. 3, the plate 100 has an enlarged center portion greater than the diameter of the shaft 64, which has a pin 101 slidable in a passage 102 in the shaft 64 and being longer than the passage 102 so that at least one end protrudes beyond the shaft 64.

The enlarged center portion of the plate 100 includes three open portions 103. Each of the open portions 103 is constant in area from a radially extending surface 104 to a point 104' and then decreases to a point 105 having a slightly greater diameter than the diameter of the shaft 64. Each of the points 104' is diametrically opposite one of the points 105.

The pin 101 is disposed within one of the three open portions 103 as shown in FIG. 3. When the shaft 64 rotates counterclockwise (as viewed in FIG. 3) during movement of the hopper 12 in a forward direction, the pin 101 engages the surface 104 of the open portion 103 in which the pin 101 is disposed to drive the fluted roller 91.

The retaining washers 98 (see FIG. 1) and 99 and the plate 100 are attached to the fluted roller 91 by screws 106 extending into holes 107 (see FIG. 2) in the circular elements 96 of the fluted roller 91 after passing through aligned holes in the retaining washers 98 and 99 and the plate 100. The screws 106 (see FIG. 3) cut threads in the holes 107 (see FIG. 2) in the circular hollow elements 96 when advanced thereinto. The other end of the fluted roller 91 has a single retaining washer 107' (see FIG. 1) attached thereto by the screws 106 in the same manner as the screws 106 attach the retaining washers 98 and 99 and the plate 100 to the fluted roller 91.

When the shaft 64 rotates clockwise (as viewed in FIG. 3) due to the hopper 12 being moved in a rearward direction, the pin 101 will not engage the surface 104 of any of the open portions 103 but will pass the point 105 of each of the open portions 103 prior to entering the next of the open portions 103 and may have a frictional engagement with the point 105. To insure that there is no rotation of the fluted roller 91 (see FIG. 1) when the shaft 64 rotates clockwise (as viewed in FIG. 3) due to the hopper 12 being moved in a rearward direction, a back stop 108, which is an L-shaped finger mounted on the L-shaped angle 38 by a screw 109, engages one of the flutes or fingers 92 of the fluted roller 91. This insures that there is no rotation of the fluted roller 91 except when there is movement of the hopper 12 in the forward direction through rotation of the wheels 65 (see FIG. 1) and 66.

As shown in FIG. 2, each of the flutes or fingers 92 has its tip 110 disposed as close as possible to the shutter 29. Thus, as material 110' flows from the bottom of the hopper 12 through the openings 25 in the gate 20 and the openings 30 in the shutter 29, the material 110' cannot flow directly to the ground 11 but will flow between the flutes or fingers 92 of the fluted roller 91. As the fluted roller 91 rotates during forward motion of the hopper 12, the material 110' flows onto the ground 11 at the desired rate in accordance with the position of the openings 30 in the shutter 29 relative to the openings 25 in the gate 20.

As soon as the fluted roller 91 ceases to rotate because the hopper 12 is no longer being moved in the forward direction (The hopper 12 could either be stopped or be moving in the reverse direction.), the material 110' flows from the hopper 12 into the spaces between the flutes or fingers 92 at the top of the fluted roller 91. The material 110' flows from the bottom of the hopper 12 until its angle of repose is reached between each pair of the flutes of fingers 92 of the fluted roller 91 at the top of the fluted roller 91 as shown in FIG. 2. When this occurs, flow stops. The angle of repose is the angle at which no more of the material 110' can flow from the bottom of the hopper 12 because of the build up of the material 110' between the flutes or fingers 92 of the fluted roller 91.

Therefore, there can be flow from the hopper 12 only when there is movement of the hopper 12 in the forward direction. Thus, flow from the hopper 12 ceases when the hopper 12 is stopped or is moved in the rearward direction.

To keep the material 110' within the hopper 12 broken up so that it will easily flow from the bottom of the hopper 12, the agitator shaft 78 has a pair of agitator elements 111 mounted thereon. Each of the agitator elements 111 includes a longitudinal central portion 112 having a curvature to surround a portion of the agitator shaft 78 and inclined longitudinal outer portions 113 and 114 extending from each side of the longitudinal central portion 112.

Figure 8:
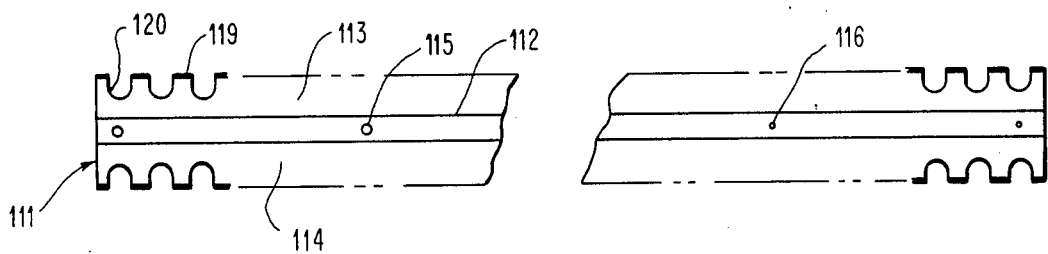
FIG. 8 is a fragmentary top plan view of one of the agitator elements of the gravity spreader of FIG. 1.

Each of the longitudinal central portions 112 has a pair of longitudinally spaced enlarged openings 115 (see FIG. 8) at one end and a pair of longitudinally spaced smaller openings 116 at its other end. Each of the enlarged openings 115 receives a self-threading screw 117 (see FIG. 2), which is smaller than the opening 115 (see FIG. 8) to enable it to pass therethrough and through a passage in the agitator shaft 78 (see FIG. 2). Each of the smaller openings 116 (see FIG. 8) has the self-threading screw 117 (see FIG. 2) extending therethrough and threaded thereinto. Thus, the two agitator elements 111 can be formed the same whereby two of the adjacent screws 117 have their heads at the same position on the shaft 78 as shown in FIG. 2 and the other two are diametrically disposed thereto.

Each of the inclined outer longitudinal portions 113 and 114 of each of the agitator elements 111 is formed with tips 119 (see FIG. 5) between cut out portions 120. The tips 119 have their centers aligned with the walls 27 of the openings 25 in the gate 20. Thus, the tips 119 aid in directing the agitated material within the hopper 12 towards the openings 25 (see FIG. 2) in the gate 20.

Each of the first tow bars 63, which is L-shaped in the horizontal plane as shown in FIG. 5, is connected to a second tow bar 121, which also is L-shaped in the horizontal plane as shown in FIG. 5, by carriage bolts 122 and nuts 123. The second tow bars 121 have forward portions 124 spaced from each other by a spacer 125 through which a carriage bolt 126 extends for cooperation with a nut 127.

Figure 6:
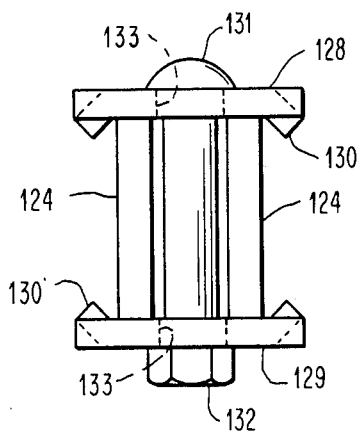
FIG. 6 is an end elevational view of the upper end of towing means for controlling movement of the gravity spreader along the ground.

As shown in FIG. 6, the front ends of the portions 124 of the second tow bar 121 have an upper clevis strap 128 and a lower clevis strap 129 overlapping them. Each of the clevis straps 128 and 129 has projections 130 to hold the front ends of the forward portions 124 of the second tow bars 121 against each other. Carriage bolts 131 and nuts 132 secure the clevis straps 128 and 129 to each other and to the front portions 124 of the second tow bars 121.

The forward ends of the clevis straps 128 and 129 have aligned openings 133 to receive a tow bar. Thus, the user may attach the tow bar to a tractor draw bar, for example, for pulling the hopper 12.

If desired, the hopper 12 could have an aerator 135 (see FIG. 2) attached thereto. The aerator 135 could be similar to the aerator shown and described in my copending patent application for "Aerator And Method Of Assembly," Ser. No. 566,510, filed Dec. 29, 1983, now abandoned.

The aerator 135 includes a frame 136, which is carried by a pair of arms 137 extending forwardly from the support plates 60 of the hopper 12. Each of the arms 137 is attached to one of the plates 60 by a pivot pin 138 extending through aligned openings in each of the arms 137 and the support plates 60 and retained therein by a cotter pin 139 extending through a passage in the pivot pin 138.

The frame 136 is attached to each of the arms 137 by bolts 140 and nuts 141. The bolts 140 and the nuts 141 also secure side plates 142 to the frame 136. Each of the side plates 142 supports a shaft 143, which has blades 144 mounted thereon in the manner more particularly shown and described in my aforesaid patent application. The shaft 143 is supported on the side plates 142 in the manner shown and described in my aforesaid patent application.

A transport bar 145 is disposed beneath a horizontally disposed plate 146 of the frame 136 and secured thereto by suitable means such as bolts 147 and nuts 148, for example. The transport bar 145 enables pivoting of the arms 137 about the pivot pins 138 to raise the aerator blades 144 out of engagement with the ground 11.

The transport bar 145 has elongated slots 149 to have a loose slot connection with the bolts 147 and the nuts 148 attaching the transport bar 145 to the plate 146 of the frame 136. The plate 146 can support weight when desired for additional penetration into the ground 11 by the aerator blades 144.

Figure 9:
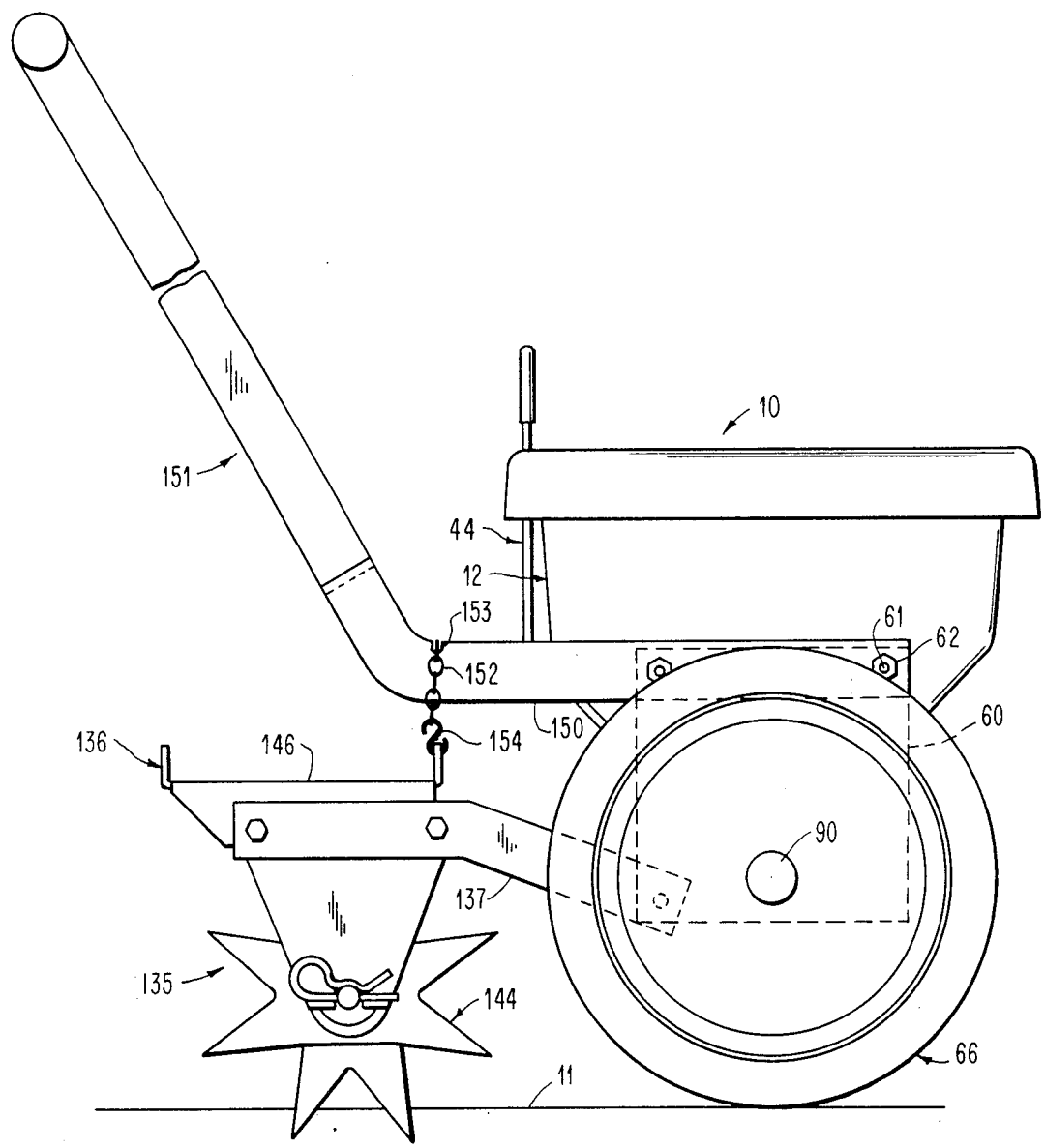
FIG. 9 is a fragmentary side elevational view of a portion of a modification of the gravity spreader in which the gravity spreader is pushed.

Referring to FIG. 9, the gravity spreader 10 is shown having portions 150 of a handle 151 attached to each of the two support plates 60 by the bolts 61 and the nuts 62 rather than the first tow bars 63 (see FIG. 2). Each of the two portions 150 (see FIG. 9) could have adjacent portions connected to each other by bolts and nuts, for example. It also is necessary to reverse the plate 100 (see FIG. 3) so that the wheel 65 (see FIG. 2) will rotate the fluted roller 91 when the shaft 64 rotates clockwise in FIG. 2 since this is the direction of forward motion of the gravity spreader 10 when it is being pushed.

If desired, the aerator 135 (see FIG. 9) may be used when the gravity spreader 10 is pushed. However, because of the absence of the second tow bars 121 (see FIG. 5) on which the transport bar 145 rests when the aerator 135 (see FIG. 2) is lifted to a transport position so that the aerator blades 144 are out of engagement with the ground 11, it is necessary to utilize retaining means to hold the aerator 135 in its raised position and the transport bar 145 would not be employed. For example, a chain 152 (see FIG. 9) may extend between the frame 136 of the aerator 135 and each of the portions 150 of the handle 151. Each of the chains 152 would be adjustably connected to the adjacent portion 150 of the handle 151 to shorten its length when the aerator blades 144 are to be held out of engagement with the ground 11.

For example, each of the portions 150 of the handle 151 could have a notch 153 to receive the link between two of the balls of the chain 152 to hold the aerator 135 in its raised position. Each of the chains 152 could be connected to the aerator 135 by an S-hook 154.

It should be understood that the aerator 135 would be engaging the ground 11 (see FIG. 2) after the material 110' has been deposited on the ground 11. This is the opposite to that when the gravity spreader 10 is pulled as shown in FIG. 2.

While the fluted roller 91 has been shown as preventing the flow of material 110' from the hopper 12 to the ground 11 when the hopper 12 is not being moved in the forward direction, any other suitable means responsive to the forward movement of the hopper 12 for allowing flow while preventing flow at other times may be utilized. For example, a conveyor could be positioned beneath the hopper 12 and be driven only when the hopper 12 is moving in a forward direction. The conveyor would be positioned as close as possible to the shutter 29 so that the material 110' would have an angle of repose so as to not flow to the ground 11 when the conveyor is stopped.

An advantage of this invention is that it prevents overdeposit of material by a gravity spreader. Another advantage of this invention is that it enables a gravity spreader to have its motion reversed without having to manually close the material flow openings while still stopping material flow when there is not forward movement of the gravity spreader. A further advantage of this invention is that it avoids the possibility of losing a desired flow rate from a gravity spreader when beginning forward movement after having previously stopped the gravity spreader or had reverse movement of the gravity spreader.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A gravity spreader including:
   a hopper having an open upper end, a bottom wall, and a plurality of walls extending upwardly from said bottom wall to form said open upper end;
   a pair of substantially parallel plates extending downwardly from said walls of said hopper beyond said bottom wall;
   a shaft rotatably supported by each of said plates;
   a wheel supported on each end of said shaft, at least one of said wheels being always connected to said shaft to cause rotation of said shaft with said wheels;
   opening means in at least said bottom wall of said hopper to allow material in said hopper to flow therethrough;
   control means to control whether said opening means is open or closed and the amount that said opening means is open to control the rate of flow of material from said hopper;
   means rotatably mounted on said shaft and disposed beneath said opening means to allow flow from said hopper through said opening means to the ground when said opening means is open and only when said hopper is moved in a forward direction;
   and connecting means to connect said rotatably mounted means to said shaft for rotation therewith only when said wheels rotate to move said hopper in a forward direction.

2. The gravity spreader according to claim 1 in which:
   said connecting means includes:
      first means connected to said shaft;
      second means connected to said rotatably mounted means;
      and said first means transmits rotation of said shaft to said second means to rotate said rotatably mounted means with said shaft only when said wheels rotate to move said hopper in a forward direction;
      and means cooperating with said rotatably mounted means to prevent movement of said second means when said wheels rotate to move said hopper in a rearward direction.

3. The gravity spreader according to claim 2 in which said rotatably mounted means includes:
   a roller having a plurality of outwardly extending means equally angularly spaced from each other, said roller being fixed to said second means of said connecting means;
   and each of said outwardly extending means extending longitudinally for at least the length of said opening means in said hopper.

4. A gravity spreader including:
   a hopper having an open upper end, a bottom wall, and a plurality of walls extending upwardly from said bottom wall to form said open upper end;
   a pair of substantially parallel plates extending downwardly from said walls of said hopper beyond said bottom wall;
   a shaft rotatably supported by each of said plates;
   a wheel supported on each end of said shaft, one of said wheels being rotatably mounted on said shaft and the other of said wheels being connected to said shaft to cause rotation of said shaft with said wheels;
   agitating means disposed within said hopper; means to connect said agitating means to said one wheel to rotate said agitating means whenever said wheels rotate in either direction;
   opening means in at least said bottom wall of said hopper to allow material in said hopper to flow therethrough;
   control means to control whether said opening means is open or closed and the amount that said opening means is open to control the rate of flow of material from said hopper;
   means rotatably mounted on said shaft and disposed beneath said opening means to allow flow from said hopper through said opening means to the ground when said opening means is open and only when said hopper is moved in a forward direction;
   and connecting means to connect said rotatably mounted means to said shaft for rotation therewith only when said wheels rotate to move said hopper in a forward direction.

5. The gravity spreader according to claim 4 in which:
   said connecting means includes:
      first means connected to said shaft;
      second means connected to said rotatably mounted means;
      and said first means transmits rotation of said shaft to said second means to rotate said rotatably mounted means with said shaft only when said wheels rotate to move said hopper in a forward direction;
      and means cooperating with said rotatably mounted means to prevent movement of said second means when said wheels rotate to move said hopper in a rearward direction.

6. The gravity spreader according to claim 5 in which said rotatably mounted means includes:
- a roller having a plurality of outwardly extending means equally angularly spaced from each other, said roller being fixed to said second means of said connecting means;
- and each of said outwardly extending means extending longitudinally for at least the length of said opening means in said hopper.

7. The gravity spreader according to claim 5 including means attached to each of said plates to enable movement of said hopper.

8. The gravity spreader according to claim 5 including:
- aerating means for aerating the ground;
- said aerating means including rotatably mounted means for engaging spaced intervals of the ground during movement to aerate the ground during movement of said hopper in a forward or reverse direction;
- and means to pivotally mount said aerating means on each of said plates for movement between a position in which said rotatably mounted means of said aerating means engages the spaced intervals of the ground and a position in which said aerating means is spaced from the ground.

9. A gravity spreader including:
- material holding means for holding material to be spread;
- wheel means for supporting said material holding means for movement along the ground in a forward or rearward direction, said wheel means being connected to said material holding means and engaging the ground;
- said material holding means having opening means at its bottom to allow flow of material therefrom;
- first means for controlling the rate of flow of material through said opening means, said first means being movable to a position to stop flow through said opening means in addition to controlling the rate of flow;
- second means to stop flow through said opening means when said material holding means is not moving in a forward direction irrespective of the open position of said first means;
- said second means including rotatable means rotatable in response to said wheel means moving said material holding means in a forward direction to direct material flowing through said opening means to the ground when said material holding means is moving in a forward direction, said rotatable means being disposed beneath said opening means to catch the material as it flows through said opening means and to carry the material to a position at which it falls from said rotatable means to the ground during rotation of said rotatable means, said rotatable means having the same axis of rotation as said wheel means;
- control means to cause rotation of said rotatable means when said wheel means moves said material holding means in a forward direction so that material falls to the ground at substantailly the rate that it flows through said opening means;
- and said second means including means engageable with said rotatable means to prevent said rotatable means from rotating when said wheel means moves said material holding means in a reverse direction so that flow of material from said material holding means through said opening means is stopped.

10. The gravity spreader according to claim 9 in which said rotatable means includes:
- a roller having a plurality of outwardly extending means equally angularly spaced from each other;
- and each of said outward extending means extending longitudinally for at least the length of said opening means in said material holding means.

* * * * *

UNITED STATES PATENT AND TRADEMARK OFFICE
CERTIFICATE OF CORRECTION

PATENT NO. : 4,624,195

DATED : November 25, 1986

INVENTOR(S) : Charles W. Doering

It is certified that error appears in the above-identified patent and that said Letters Patent is hereby corrected as shown below:

Column 7, line 3, "of" (second occurrence) should read -- or --.

Column 10, lines 1 to 7 should read as follows:

-- second means connected to said rotatably mounted means;

and said first means transmits rotation of said shaft to said second means to rotate said rotatably mounted means with said shaft only when said wheels rotate to move said hopper in a forward direction;

and means cooperating with said rotatably mounted --.

UNITED STATES PATENT AND TRADEMARK OFFICE
CERTIFICATE OF CORRECTION

Page 2 of 2

PATENT NO. : 4,624,195
DATED : November 25, 1986
INVENTOR(S) : Charles W. Doering It is certified that error appears in the above-identified patent and that said Letters Patent is hereby corrected as shown below:

Column 10, lines 34 to 36 should read as follows:

-- agitating means disposed within said hopper;

means to connect said agitating means to said one wheel to rotate said agitating means whenever said-- line 62, "onlv" should read -- only --.

This certificate supersedes certificate of correction issued June 16, 1987.

Signed and Sealed this

Eighth Day of September, 1987

Attest:

DONALD J. QUIGG

Attesting Officer

Commissioner of Patents and Trademarks